United States Patent
Thakkar et al.

(10) Patent No.: US 10,938,666 B2
(45) Date of Patent: Mar. 2, 2021

(54) NETWORK TESTING SIMULATION

(71) Applicant: HEWLETT PACKARD ENTERPRISE DEVELOPMENT LP, Houston, TX (US)

(72) Inventors: Sanchal Thakkar, Karnataka (IN); Yashavantha Nagaraju, Karnataka (IN); Ashmitha Jiv Shetty, Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 39 days.

(21) Appl. No.: 16/110,979

(22) Filed: Aug. 23, 2018

(65) Prior Publication Data
US 2020/0067788 A1 Feb. 27, 2020

(51) Int. Cl.
*H04L 12/24* (2006.01)
*H04L 12/26* (2006.01)

(52) U.S. Cl.
CPC ........ *H04L 41/145* (2013.01); *H04L 43/0876* (2013.01); *H04L 41/12* (2013.01)

(58) Field of Classification Search
CPC ... H04L 41/12; H04L 41/145; H04L 43/0876; H04L 43/026; H04L 43/50
See application file for complete search history.

(56) References Cited

U.S. PATENT DOCUMENTS

| | | | |
|---|---|---|---|
| 7,447,622 B2 | 11/2008 | Arama et al. | |
| 9,183,121 B2 | 11/2015 | Pruss et al. | |
| 9,882,784 B1 | 1/2018 | Lotfi | |
| 2006/0077963 A1* | 4/2006 | Li | H04L 29/06027 370/352 |
| 2011/0282642 A1 | 11/2011 | Kruger et al. | |
| 2012/0113965 A1* | 5/2012 | Puthenpura | H04W 28/08 370/338 |
| 2014/0337674 A1 | 11/2014 | Ivancic et al. | |
| 2015/0199207 A1* | 7/2015 | Lin | G06F 9/45533 718/1 |
| 2017/0177324 A1* | 6/2017 | Frank | G06F 16/173 |

OTHER PUBLICATIONS

WebNMS, (Web Page), Retrieved Jul. 26, 2018, 4 Pgs.

* cited by examiner

*Primary Examiner* — Kevin C. Harper
*Assistant Examiner* — Derrick V Rose
(74) *Attorney, Agent, or Firm* — Nolte Lackenbach Siegel

(57) ABSTRACT

A method for network testing simulation includes generating a simulated network configuration comprising a plurality of simulation nodes based on a topology of an existing network. The method also includes determining a peak traffic for the existing network based on a volume of traffic processed by the existing network, and a plurality of protocols of the traffic. The method further includes generating a simulated traffic based on the peak traffic, the protocols, and the simulated network configuration. Additionally, the method includes processing the simulated traffic using the simulated network configuration to generate a plurality of simulation states of the nodes. Also, the method includes determining whether the software upgrade is tested successfully based on the generated states of the nodes.

18 Claims, 4 Drawing Sheets

NETWORK TESTING SIMULATION

BACKGROUND

The Internet has enabled the growth of many network-connected software applications, such as e-commerce applications. For businesses with revenues tied to e-commerce failures in the network communications that connect businesses to their customers may be costly. Thus, testing these networks may be useful when new software is developed, or existing software is updated.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Before initially deploying a networked computer system, such as an e-commerce system, there may be testing done to ensure the stability and reliability of the software and the computer network. However, while computer networks may undergo testing before their initial deployment, over time, the volumes and types of traffic that travel over these computer networks may change. As such, the testing done for the initial deployment may not be sufficient to ensure the deployed network is capable of supporting such changes. Further, to be competitive and to remain relevant, organizations may periodically update their software with new enhancements. When deploying such updates, to ensure the stability and reliability of the computer networks that incorporate these updates, a testing environment that mirrors the live production environment may be used. Such testing environments are referred to as system testing environments. However, building a system testing environment may involve duplicating many resources from the live production environment, which may be costly. Additionally, system testing environments may merely be used when software updates are being tested, and thus may spend long periods of time idle. Due to the cost, and potential lack of use of expensive equipment, some organizations may not build system test environments to perform system testing. However, not performing system testing may bring about the risk of a failure in the live production environment. Such failures may be costly in both lost revenue and in damage to an organization's reputation. Thus, organizations may hire network experts to evaluate the computer networks' ability to support software updates. However, network experts may also be costly, and susceptible to error.

Accordingly, examples of the present disclosure may provide a simulation of a live computer network production environment for testing software upgrades. The simulation may provide the ability to determine the stability and reliability of a computer network when implementing software upgrades. In this way, an automated method of network testing may be performed without building and maintaining a traditional system testing environment.

Figure 1:
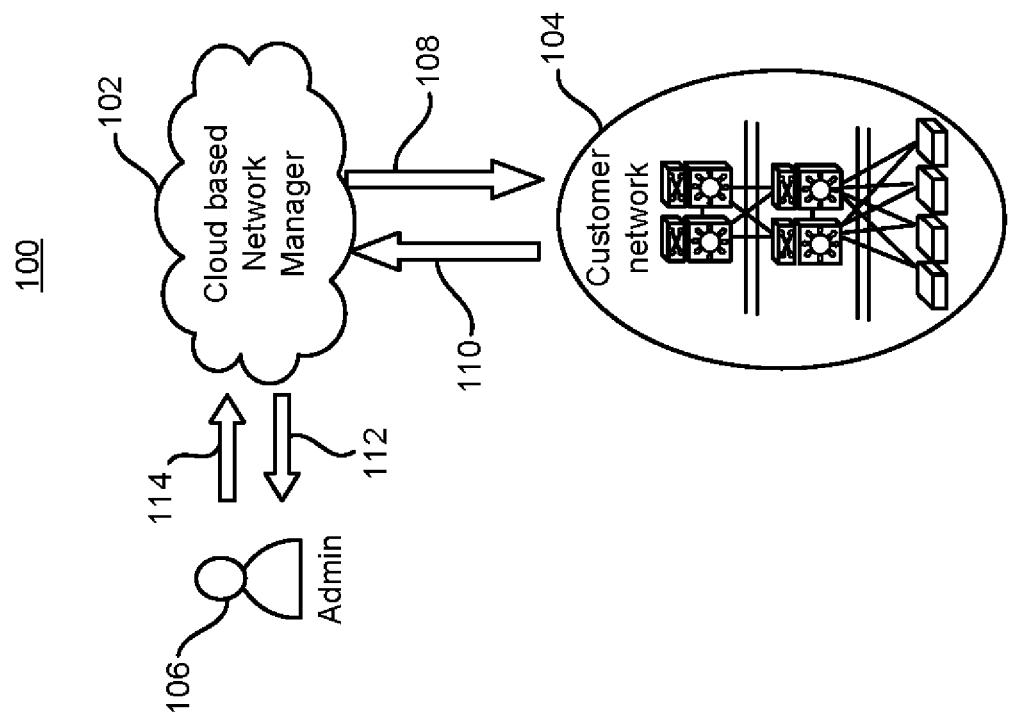
FIG. 1 is an example system for cloud-based management of a live customer network.

FIG. 1 is an example system for cloud-based management of a live customer network. The system 100 may include a cloud-based network manager 102, a customer network 104, and an administrator 106. The cloud-based network manager 102 may be a computer system connected to the customer network 104 over the Internet that monitors the customer network 104 to identify details about the customer network 104. The identified details may be used to run a simulation of the customer network 104 to potentially test software upgrades to the customer network 104. Additionally, the cloud-based network manager 102 may run a network testing simulation. The network testing simulation may involve generating a simulated version of the customer network 104 that processes a simulated version of the customer network 104 traffic. In examples, the cloud-based network manager 102 may provide details about the customer network 104 to the administrator 106, which may be a user interface where details of the monitoring and the simulation may be configured. Through the administrator 106, it is possible to configure the details for a simulated networking environment and monitor the customer network 104.

In examples, the administrator 106 may be used to specify how the cloud-based network manager 102 may monitor the customer network 104 to collect details for the network testing simulation. For example, the administrator 106 may be used to specify that the cloud-based network manager 102 monitors the customer network 104 over a number of days. Monitoring may be performed on all the nodes of the customer network, including a core switch. The core switch of the customer network 104 may be a switch that receives traffic from all incoming ports.

The cloud-based network manager 102 may monitor the customer network 104 to determine the topology, traffic patterns, and behavior patterns of the customer network 104. The customer network 104 may be a single network, or may include multiple computer networks, such as local area networks and wide area networks. The topology may describe the architecture of the customer network 104, which may consist of many nods, including servers, network switches, network routers, and end user devices. The servers may be computing devices that run the software of a particular system. For example, a mail server may be a computing device that processes email. The network switches may be network devices that connect the other devices of the customer network 104 to each other, such as the servers, routers, access points, gateways, and end user devices. If the customer network 104 includes multiple networks, the network routers may connect the networks to each other. The end user devices may be the computing devices that serve as the input devices to the customer network 104. The switches, routers, and end user devices may be physical devices or virtual devices.

The cloud-based network manager 102 may continuously monitor the customer network 104 and determine the traffic pattern of the customer network 104. The traffic pattern may describe the actual data packets that are processed by the customer network 104 in terms of traffic volume (peak, average, low, difference between peak and low, etc.), and traffic protocols. The peak traffic may describe the maximum volume of traffic processed by the core switch within each one second timeframe. The traffic protocols may describe the type of traffic processed by the customer network 104. Traffic protocols may include the various types of traffic processed by computer communication networks, such as hypertext transfer protocol secure (https), transmission control protocol/Internet protocol (TCP/IP), border gateway protocol (BGP), Internet control message protocol (ICMP), Internet group management protocol (IGMP), open shortest path first (OSPF), and the like. To determine the traffic pattern, the cloud-based network manager 102 may monitor a main network switch of the customer network 104 or all the nodes of the customer network 104 over a specified period of time. In this way, the cloud-based network manager 102 may determine the peak traffic, average traffic, low traffic, and traffic protocols for all of the nodes of the customer network 104, including the core switch.

The behavior patterns of the customer network 104 may describe how the nodes of the customer network 104 function during the monitoring period. For example, the behavior pattern may be described in terms of states of the nodes. The states may represent how much memory and processing power are used by each node during the monitoring period. The states may be determined using show commands on the nodes. The show commands may provide information about the nodes of the customer network 104 indicating whether the nodes are undergoing any stresses during the monitoring perod, such as memory leaks, thrashing, incoming packets, number of packets transmitted or dropped, and the like.

The arrow 108 represents the queries performed by the cloud-based network manager 102 to monitor the customer network 104. The arrow 110 represents the topology, traffic pattern, and/or behavior pattern (e.g., state information) derived from this monitoring of the customer network 104. The arrow 112 represents the topology and traffic pattern information being provided to the administrator 106 by the cloud-based network manager 102. The arrow 114 represents the configuration information specified by the administrator 106 for generating the network testing simulation. In examples, the administrator 106 may display the information derived from the customer network 104. Additionally, the administrator 106 may be configured to customize a simulation of the customer network 104. In examples, the administrator 106 may provide the ability to identify the length of the simulation in terms of hours or days. Additionally, the administrator 106 may be used to select specific protocols of traffic to be simulated at the traffic volumes, e.g., peak traffic, average traffic, low traffic, identified by the cloud-based network manager 102. Selecting specific protocols for simulating specific traffic volumes may be useful in testing the customer network's ability to support a range of scenarios. In examples, the protocols that are not selected may be simulated at default volumes. The default volumes may be determined based on the capabilities of the individual nodes. Further, the administrator 106 may be used to scale the traffic volume of the simulation. In examples, the peak traffic, average traffic, and low traffic, may be scaled up or down. Additionally, the administrator 106 may provide the ability to make modifications to the topology that is used in the simulation. Modifications may include adding or subtracting nodes from the topology of the customer network 104. Running simulations on a modified version of the customer network 104 topology may make it possible to identify changes to the customer network 104 that can be used to support a new upgrade build. The term, upgrade build, refers to the upgraded computer system for which the network testing simulation is being run.

In addition to running the network testing simulation, the cloud-based network manager 102 may monitor the simulation to determine whether the network testing simulation is successful. More specifically, the cloud-based network manager 102 may monitor the behavior of the nodes of the simulated version of the customer network 104 and compare the states of the nodes during the simulation to the states of the nodes during the original monitoring of the customer network 104. If the states identified during the simulation match the states of the nodes during the original monitoring, the cloud-based network manager 102 may determine that the network testing simulation for the upgrade build is successful. Conversely, if the states identified during the simulation do not match the states of the nodes during the original monitoring, the cloud-based network manager 102 may determine that the network testing simulation is not successful. Additionally, if one or more of the nodes in the simulated version of the customer network 104 fail during the network testing simulation, the cloud-based network manager 102 may determine that the network testing simulation is not successful. An event, such as a node failure may include a memory leak, a processor crash, and packets being dropped, for example. Any information indicating a network testing simulation failure may be provided to an operations team for further investigation.

Figure 2:
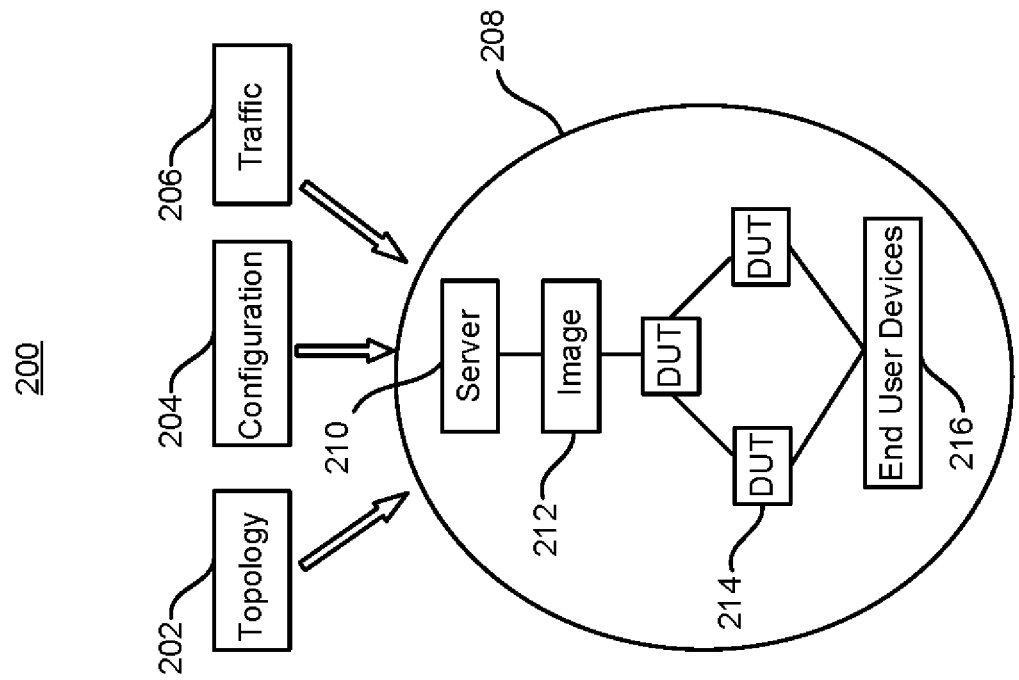
FIG. 2 is an example system for network testing simulation.

FIG. 2 is an example system 200 for network testing simulation. The system 200 includes inputs for the topology 202, configuration 204, and traffic 206 for the network testing simulation. The topology 202 may describe the topology 202 of the customer network 104, described with reference to FIG. 1. The configuration 204 may describe the modifications to the topology 202 selected using the administrator 106 for the network testing simulation. The traffic 206 may be a simulated version of the traffic pattern monitored during the monitoring process. In examples, the monitored traffic pattern is input to an external traffic generator automatically generates the traffic 206 based on the monitored traffic pattern and selections made by the administrator 106. For example, a tool, such as ixia may be used to automatically generate the traffic 206. The traffic 206 may include peak traffic, average traffic, or low traffic volumes of the protocols selected by the administrator 106. Additionally, the traffic 206 may include default traffic volumes of the protocols where the volumes are not specified. Alternatively, the specified and default traffic volumes may be scaled up or down based on selections made using the administrator 106.

The cloud-based network manager 102 may generate a simulated customer network 208 based on the topology 202 and configuration 204. The simulated customer network 208 may include various nodes, including a server 210, image 212, devices under test (DUT) 214, and end user devices 216. The nodes of the simulated customer network 208 may include physical hardware devices and virtualized network functions. Virtualized network functions may be software that executes on a computing device and behaves like a particular hardware device. Examples of virtualized network functions include virtualized switches, routers, access points, gateways, and end user devices 216. The server 210 may include the upgrade build for which the network testing simulation is being run. The image 212 may include the firmware and operating system to be installed on the DUTs of the simulated customer network 208. Additionally, the server 210 may act as a repository for the operating systems of the nodes. Accordingly, the nodes may download the image 212 from the server 210. The devices under test 214 may be the network nodes being tested for reliability and stability during the network testing simulation. In examples, the cloud-based network manager 102 may execute show commands on the DUTs 214 to determine the states of the DUTs 214 during the network testing simulation. The end user devices 216 may be user computing devices, such as the computing devices used to consume services provided by the customer network 104. During the network testing simulation, the end user devices 216 pass the traffic 206 into the simulated customer network 208. In examples, a traffic generator, such as Ixia can be used to create end user devices 216 that can send the traffic 206 to the devices under test 214.

Figure 3:
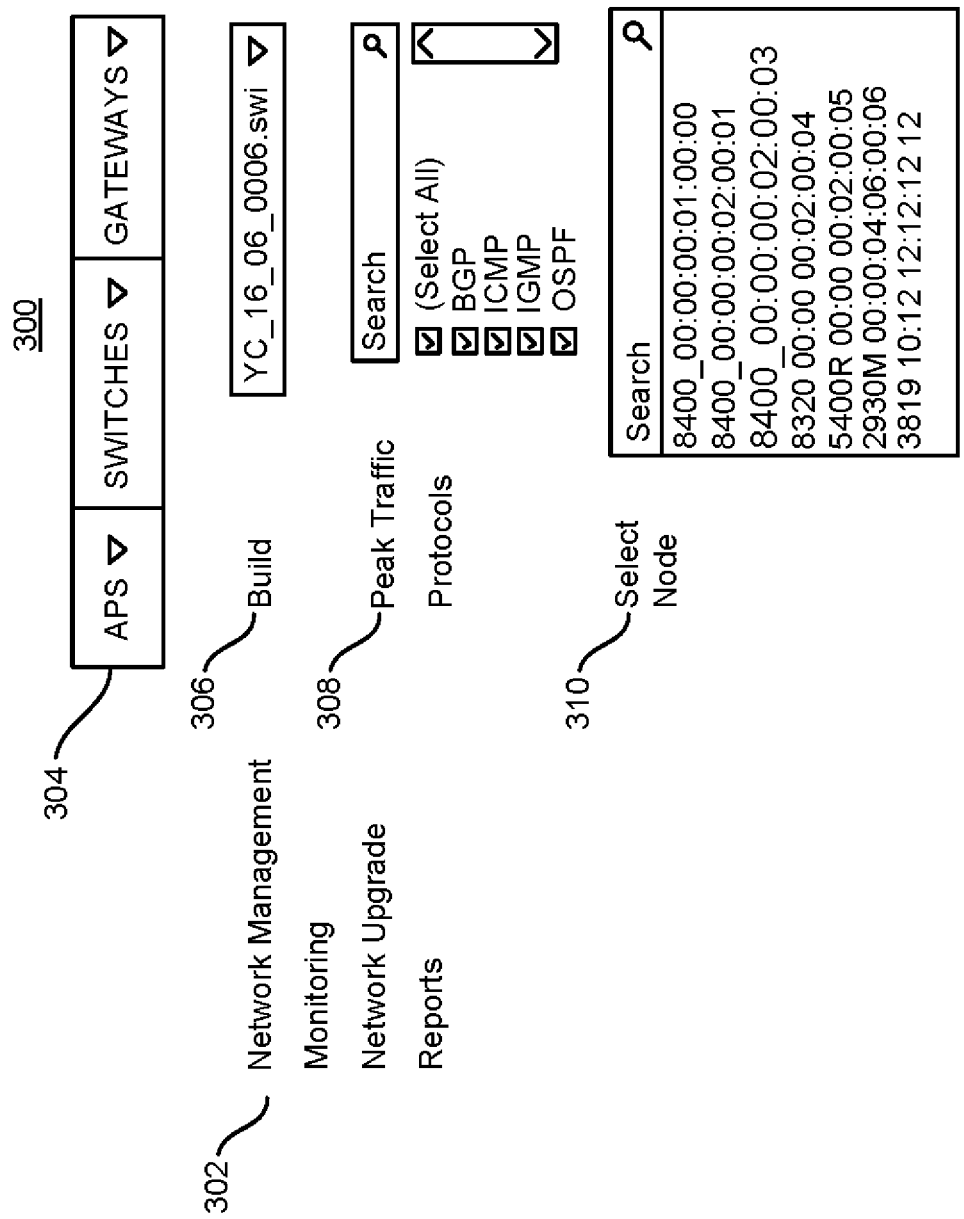
FIG. 3 is an example user interface for enabling build stability using a cloud-based network manager.

FIG. 3 is an example user interface for enabling build stability using a cloud-based network manager. The example user interface 300 may be a user interface that is used to configure the monitoring and network testing simulation, such as the administrator 106, described with respect to FIG. 1. Referring back to FIG. 3, the example user interface 300 includes a Network Management menu 302 and a network node menu 304. In this example, the Network Management menu 302 provides selectable items, labeled "Monitoring," "Network Upgrade," and, "Reports." The contents of the example user interface 300 may be changed based on the selection from the network management menu 302. In the example user interface 300, the "Network Upgrade" item is selected. Accordingly, the example user interface 300 includes a Build field 306, Peak Traffic Protocols field 308, and Select Node field 310. The Build field 306 may provide a list of upgrade builds that are available for the network testing simulation. The firmware image loaded onto the nodes of the simulated customer network 208 may be based on the selection made in the Build field 306. The Peak Traffic Protocols field 308 may provide a list of the traffic protocols detected during the monitoring of the customer network 104. In examples, the Peak Traffic Protocols field 308 may enable the selection of all detected traffic protocols, individual traffic protocols, or a subset of traffic protocols. Alternatively, the user interface 300 may include an Average, Low, or Peak-Low Difference, Traffic Protocols field instead of the Peak Traffic Protocols field 308. The Select Node field 310 may provide a list of all the nodes representing the topology of the customer network 104. In examples, the Select Node field 310 may enable the removal of specific nodes from the simulated customer network 208.

In examples, by selecting the "Monitoring" item from the Network Management menu 302, the user interface 300 may show fields for configuring the parameters for monitoring the customer network 104, such as the nodes that are to be monitored. By selecting the "Reports" item from the Network Management menu 302, it may be possible to view the results of the monitoring or the network testing simulation, such as the states of the nodes.

The network node menu 304 may be used in combination with the Reports item from the Network Management menu 302. Thus, in order to review the states of the nodes during the network testing simulation, items from the network node menu 304 may be selected to review specific types of nodes, e.g., access points (APs), switches, gateways, and security devices.

Figure 4:
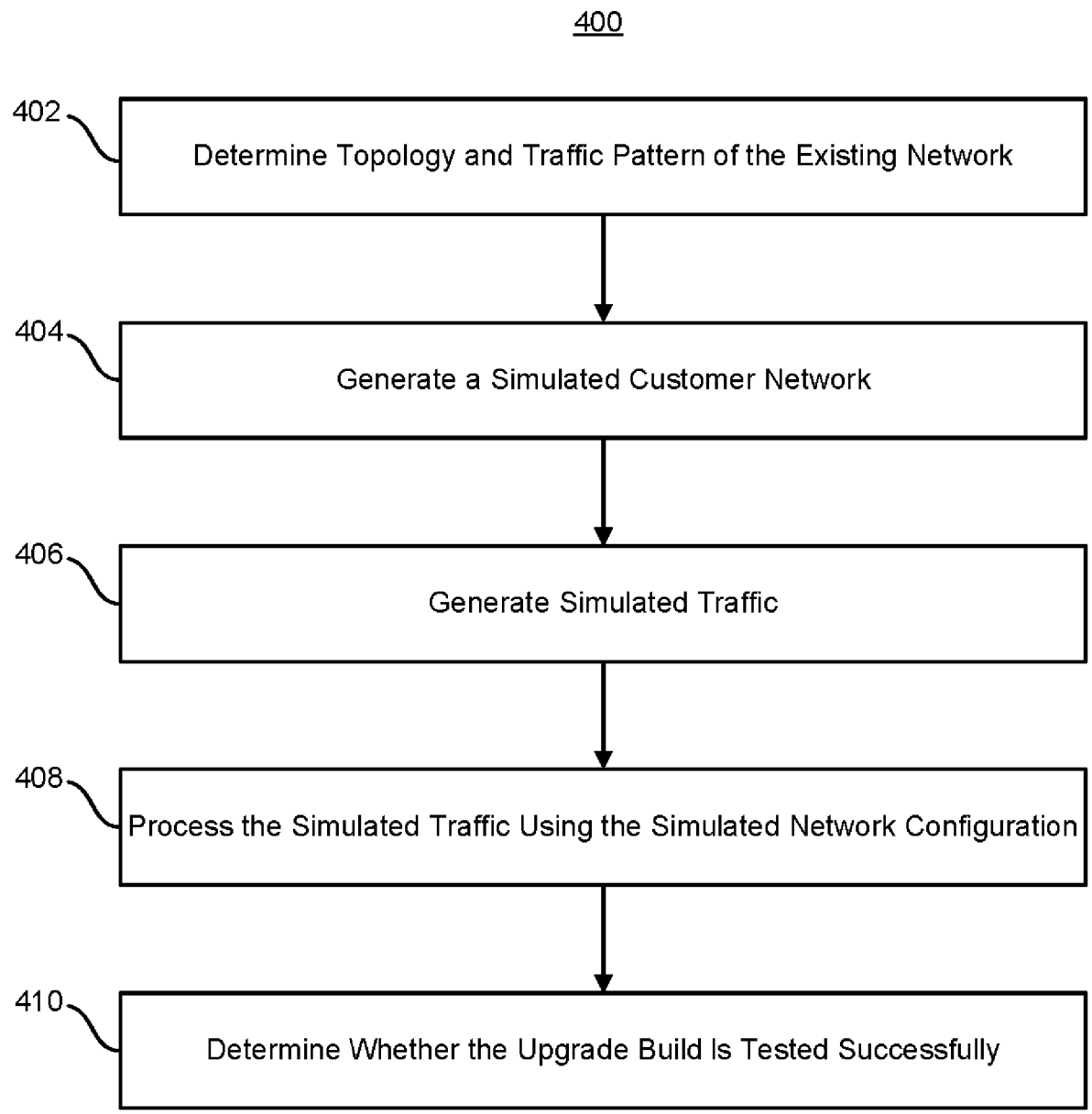
FIG. 4 is an example method for network testing simulation.

FIG. 4 is an example method 400 for network testing simulation. In examples, the method 400 may be performed by the cloud-based network manager 102. At block 402, the cloud-based network manager 102 may generate a simulated customer network, such as the simulated customer network 208. The simulated customer network 208 maybe based on the topology of an existing customer network, such as the customer network 104. Additionally, the simulated customer network 208 may be configured to add nodes not in the customer network 104 or remove nodes that are in the customer network 104.

At block 404, the cloud-based network manager 102 may determine a topology and/or traffic pattern for the existing network. The traffic pattern may be determined based on the volume of traffic processed by the existing network (e.g., peak, average, low, difference between peak and low), and a plurality of protocols of the traffic, as observed during a specific monitoring period. In examples, the traffic in a core switch that is coming from all the ports may be monitored. A peak traffic buffer may be used that records peak volume information through the core switch every second of the monitoring process. Additionally, the peak traffic buffer may be updated when the peak volume information is exceeded. Further, the traffic volume may be recorded for each traffic protocol on each node in the customer network 104.

At block 406, the cloud-based network manager 102 may generate the simulated traffic for the network testing simulation the simulated traffic may be generated based on the peak traffic volumes and protocols derived during the monitoring of the customer network 104, and the topology of the simulated customer network 208. The topology of the simulated customer network 208 may be used to identify media access control addresses for the nodes of the simulated customer network 208 to and from which simulated traffic is transmitted, and the routing of data packets between the nodes under testing during the network testing simulation. Additionally, the simulated traffic may be generated based on the configuration 204, which may specify scaling the traffic volume, which protocols have traffic generated at peak traffic volume, which protocols have traffic generated at default traffic volumes, etc. Further, the simulated traffic may be generated based on any combination of the aforementioned factors or any other similar traffic defining factors.

At block 408, the cloud-based network manager 102 may process the simulated traffic using the simulated customer network 208. Processing the simulated traffic may involve inputting the traffic 206 to the end user devices 216. In examples, all the ports connected to the end user devices 216 act as incoming ports. The traffic generator may be used to send the traffic 206 via these ports.

Additionally, the cloud-based network manager 102 may monitor the DUTs 214 during the network testing simulation by executing show commands to determine the states of the nodes. Further, the cloud-based network manager 102 may monitor the DUTs 214 for potential failure events, such as processor crashes, memory leaks, packets being dropped, etc. At block 410, the cloud-based network manager 102 may determine whether the upgrade build is tested successfully. The determination may be based on the states of the DUTs 214 monitored during the network testing simulation. Additionally, the determination may be based on one or more failure events for the DUTs 214. In examples, snapshots of the states of each switch in simulated testing network may be stored and compared with snapshots of the nodes from the monitoring period in live network to check for any incongruency. This may indicate whether the upgrade build is reliable for the live customer network 104.

It is to be understood that the process flow diagram of FIG. 4 is not intended to indicate that the method 400 is to include all of the blocks shown in FIG. 4 in every case. Further, any number of additional blocks can be included within the method 400, depending on the details of the specific implementation. In addition, it is to be understood that the process flow diagram of FIG. 4 is not intended to indicate that the method 400 is only to proceed in the order indicated by the blocks shown in FIG. 4 in every case. For example, block 404 can be rearranged to occur before block 402.

Figure 5:
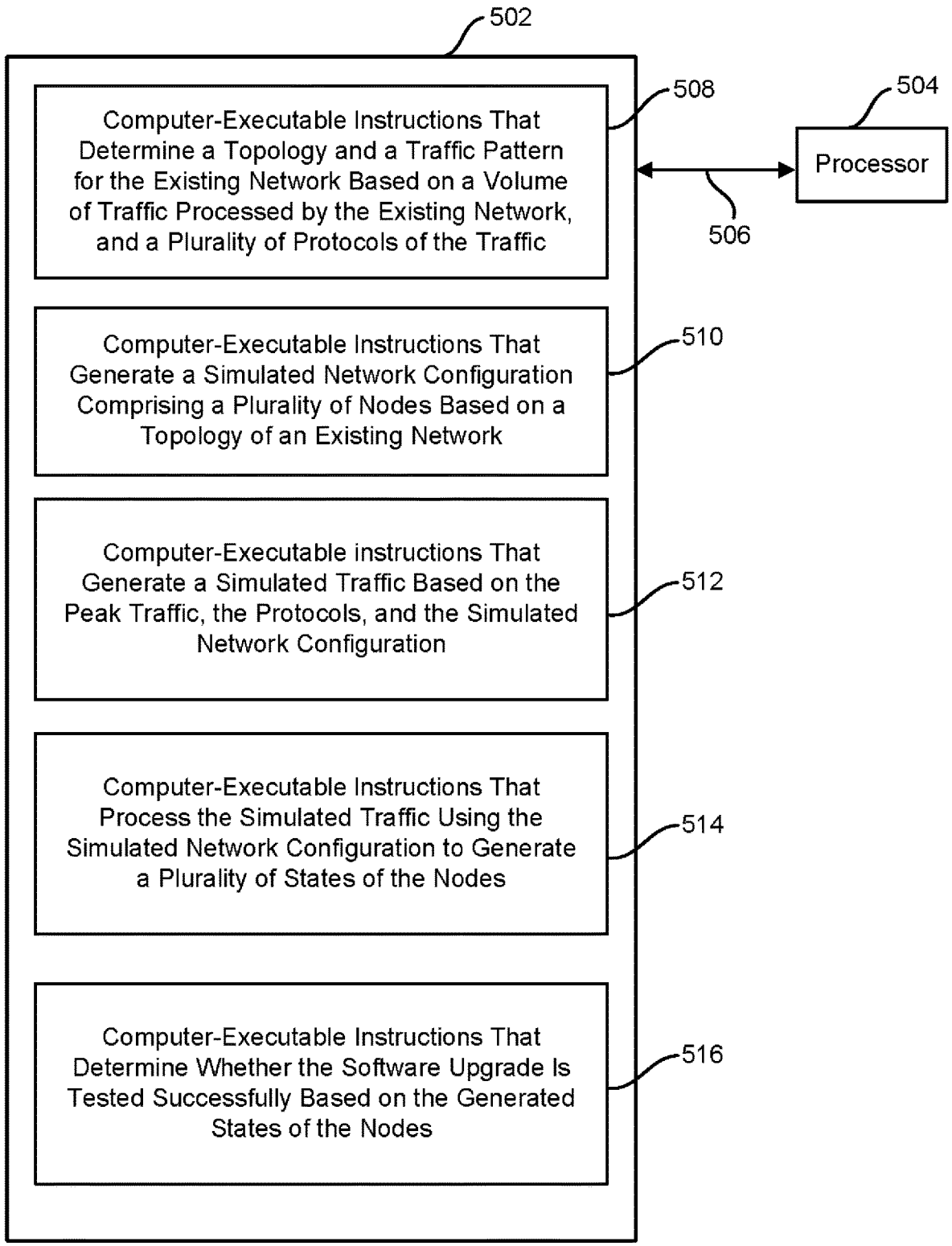
FIG. 5 is an example system having a tangible, non-transitory computer-readable medium that stores code for network testing simulation.

FIG. 5 is an example system 500 having a tangible, non-transitory computer-readable medium 502 that stores code for network testing. The tangible, non-transitory computer-readable medium is generally referred to by the reference number 502. The tangible, non-transitory computer-readable medium 502 may correspond to any typical computer memory that stores computer-implemented instructions, such as programming code or the like. For example, the tangible, non-transitory computer-readable medium 502 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 502 can be accessed by a processor 504 over a computer bus 506. A region 508 of the tangible, non-transitory computer-readable medium 502 stores computer-executable instructions that determine a topology and traffic pattern (e.g., peak traffic) of the existing network by monitoring existing network traffic that is processed by the existing network during a specified monitoring period, wherein the peak traffic is based on a volume of traffic that is processed by the existing network, and a plurality of protocols of the traffic. A region 510 of the tangible, non-transitory computer-readable medium 502 stores computer-executable instructions that generate a simulated network configuration comprising a plurality of simulation nodes based on a topology of an existing network. A region 512 of the tangible, non-transitory computer-readable medium 502 stores computer-executable instructions that generate a simulated traffic based on the peak traffic, the protocols, and the simulated network configuration. A region 514 of the tangible, non-transitory computer-readable medium 502 stores computer-executable instructions that process the simulated traffic using the simulated network configuration to generate a plurality of simulation states of the nodes. A region 516 of the tangible, non-transitory computer-readable medium 502 stores computer-executable instructions that determine whether the software upgrade is tested successfully based on the generated states of the nodes.

Although shown as contiguous blocks, the software components can be stored in any order or configuration. For example, if the tangible, non-transitory computer-readable medium 502 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for network testing simulation, comprising:
generating a simulated network configuration comprising a plurality of simulation nodes based on a topology of an existing network;
determining a peak traffic for the existing network based on a volume of traffic processed by the existing network, and a plurality of protocols of the traffic;
generating a simulated traffic based on the peak traffic, the protocols, and the simulated network configuration;
processing the simulated traffic using the simulated network configuration to generate a plurality of simulation states of the simulation nodes; and
determining whether a software upgrade is tested successfully based on the generated states of the simulation nodes by monitoring a plurality of existing network states on a plurality of existing network nodes of the existing network, and comparing the simulation states to the existing network states.

2. The method of claim 1, wherein the peak traffic is determined by monitoring existing network traffic that is processed by the existing network.

3. The method of claim 2, wherein determining the peak traffic comprises determining a maximum amount of traffic that is processed by the existing network during a specified monitoring period.

4. The method of claim 2, wherein monitoring the existing network traffic comprises:
determining a traffic amount that is processed by a core switch of the existing network;
determining a plurality of network traffic protocols that are processed by the existing network; and
determining a traffic protocol amount for each of the network traffic protocols.

5. The method of claim 2, wherein monitoring the existing network traffic comprises:
determining a traffic amount that is processed by each of a plurality of nodes of the existing network;
determining a plurality of network traffic protocols that are processed by each of the plurality of nodes; and
determining a traffic protocol amount for each of the network traffic protocols and each of the plurality of nodes.

6. The method of claim 1, wherein generating the simulated traffic comprises generating a volume of the simulated traffic that equals an amount of the peak traffic.

7. The method of claim 1, wherein the simulated traffic is generated based on a specified scale of an amount of the peak traffic.

8. The method of claim 1, wherein the simulated network configuration comprises the topology of the existing network.

9. The method of claim 1, wherein the simulated network configuration comprises a specified modification to the topology of the existing network.

10. The method of claim 1, wherein determining whether the software upgrade is tested successfully comprises determining whether a failure event occurs on one or more of the simulation nodes while the simulated network configuration is processing the simulated traffic.

11. A system, comprising:
a processor that executes stored instructions; and
a memory device that stores instructions that cause the processor to:
generate a simulated network configuration comprising a plurality of simulation nodes based on a topology of an existing network;
determine a peak traffic for the existing network by monitoring existing network traffic that is processed by the existing network during a specified monitoring period, wherein the peak traffic is based on a volume of traffic that is processed by the existing network, and a plurality of protocols of the traffic;
generate a simulated traffic based on the peak traffic, the protocols, and the simulated network configuration;
process the simulated traffic using the simulated network configuration to generate a plurality of simulation states of the simulation nodes; and
determine whether a software upgrade is tested successfully based on the generated states of the simulation nodes by monitoring a plurality of existing network states on a plurality of existing network nodes of the existing network, and comparing the simulation states to the existing network states.

12. The system of claim 11, wherein the peak traffic is determined by:
determining a maximum amount of traffic that is processed by a core switch of the existing network;
determining a plurality of network traffic protocols that are processed by the existing network; and
determining a traffic protocol amount for each of the network traffic protocols.

13. The system of claim 11, wherein the peak traffic is determined by:
determining a traffic amount that is processed by each of a plurality of nodes of the existing network;
determining a plurality of network traffic protocols that are processed by each of the plurality of nodes; and
determining a traffic protocol amount for each of the network traffic protocols and each of the plurality of nodes.

14. The system of claim 11, wherein generating the simulated traffic comprises generating a volume of the simulated traffic that equals a specified scale of an amount of the peak traffic.

15. The system of claim 11, wherein the simulated network configuration comprises a specified modification to the topology of the existing network.

16. The system of claim 11, wherein determining whether the software upgrade is tested successfully comprises determining whether a failure event occurs on one or more of the simulation nodes while the simulated network configuration is processing the simulated traffic.

17. A non-transitory, computer-readable medium storing computer-executable instructions, which when executed, cause a computer to:
generate a simulated network configuration comprising a plurality of simulation nodes based on a topology of an existing network;
determine a peak traffic for the existing network by monitoring existing network traffic that is processed by the existing network during a specified monitoring period, wherein the peak traffic is based on a volume of traffic that is processed by the existing network, and a plurality of protocols of the traffic;
generate a simulated traffic based on the peak traffic, the protocols, and the simulated network configuration;
process the simulated traffic using the simulated network configuration to generate a plurality of simulation states of the simulation nodes; and
determine whether a software upgrade is tested successfully based on the generated states of the simulation nodes by monitoring a plurality of existing network states on a plurality of existing network nodes of the existing network, and comparing the simulation states to the existing network states.

18. The non-transitory, computer-readable medium of claim 17, wherein the computer-executable instructions, when executed, cause the computer to monitor a plurality of existing network states on a plurality of existing network nodes of the existing network, wherein determining whether the software upgrade is tested successfully comprises:
comparing the simulation states to the existing network states; and
determining whether a failure event occurs on one or more of the simulation nodes while the simulated network configuration is processing the simulated traffic.

* * * * *